Patented June 11, 1929.

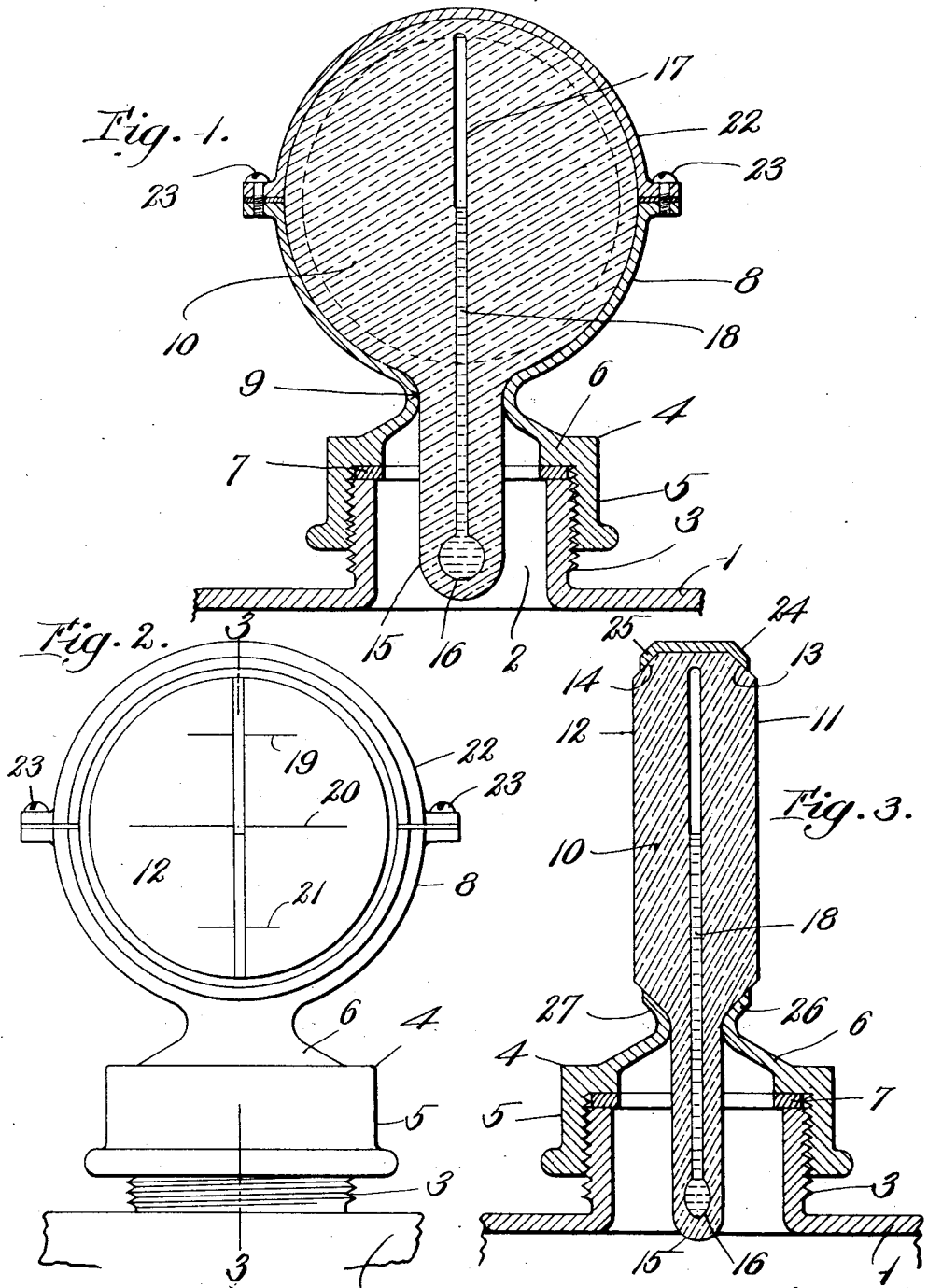

1,717,128

UNITED STATES PATENT OFFICE.

GEORGE VLASTIS, OF BOSTON, MASSACHUSETTS.

MOTOR METER.

Application filed December 12, 1927. Serial No. 239,451.

My invention relates to caps for radiators and particularly to radiator caps of the motor meter class, and it has for its object to provide an improved radiator cap of this character.

My improved radiator cap comprises a base portion which may be made from metal or other suitable material having the necessary strength, said base portion being constructed so as to be separably attached to the radiator of an automobile or the like to close the filler opening. This base portion supports a moulded block of glass formed interiorly with a vertical tubular chamber that is preferably enlarged at its lower end to provide a well or reservoir. This vertical tubular chamber contains a body of thermo-expansive fluid such as mercury and that portion of the glass block within which the lower end of said cavity, including its enlargement or reservoir portions, is located, projects or occupies a position below the base portion of the device so as to be exposed to the atmosphere within the radiator. Suitable indices or the like are provided upon the upper portion of the glass block to cooperate with the column of mercury or the like within the tubular chamber.

Other features of my invention are hereinafter pointed out.

In the accompanying drawings:

Figure 1 is a central vertical sectional view of the upper portion of an automobile radiator having applied thereto a thermometer or motor meter constructed in accordance with my invention.

Figure 2 is a rear elevation of the parts shown in Fig. 1.

Figure 3 is a section on line 3—3 of Fig. 2.

Having reference to the drawings, 1 represents the top wall of an automobile radiator and 2 the filler opening surrounded by the usual exteriorly threaded nipple 3. My improved thermometer includes, as pointed out above, a base portion and as herein shown this base portion illustrated at 1 may consist of a metal cap-like structure 4 whose skirt 5 is interiorly threaded and adapted to be screwed on to the nipple 3 as shown. This base 4 is formed at its upper end with an inwardly extending flange 6 between which and the upper end of the nipple 3, is provided a washer 7 of leather or the like that is more or less compressible. When the thermometer is in position on a radiator it is screwed down sufficiently to compress the washer 7 more or less so that the latter serves to hold the instrument against rotative displacement. The top wall or flange 6 of the base portion 4 is formed with an integral upwardly extending socket 8 which is herein shown as semi-circular in form and provided at its bottom with a more or less elliptical opening 9.

Seated within the socket 8 is a block of transparent glass 10 whose upper body portion is approximately circular as viewed from the front or rear, said body portion being herein shown as provided with front and rear faces 11 and 12 which are flat. Also, this upper body portion of the block of glass 10 is made upon its exterior with circular beveled marginal portions 13 and 14 which fit the internal cross sectional shape of the socket portion 8 of base 4. Upon its bottom side the block of glass 10 is made with an integral extension 15 projecting through the opening or aperture 9 into the nipple 3 so that this extension 15 is surrounded with the atmosphere within the radiator 1 and will correspond in temperature with the temperature of said atmosphere. At its lower end the extension 15 is moulded with a relatively large chamber or reservoir 16 and communicating with the top of this reservoir chamber 16 is an upwardly extending tubular cavity or chamber 17 of relatively small diameter. This tubular chamber 17 extends upwardly to near the top of the block 10 and is at the middle of the latter. Confined within the reservoir 16 and the vertical tubular chamber 17 is a body 18 of mercury or other thermo-expansive fluid and it will be clear that as the temperature of the atmosphere within the radiator varies the height of the column of mercury within the tubular cavity 17 will also vary correspondingly.

Upon one or both of the flat faces 11 and 12 of the block 10 there is etched, or otherwise provided, indices 19, 20 and 21 to cooperate with the top of the column of mercury within the tubular cavity 17. Thus the driver of the vehicle, from his position on the seat of the latter, can at all times see the relationship that exists between the top of the column of mercury and the indices 19, 20 and 21 and be guided thereby accordingly.

The block of glass 10 is held securely within the socket 8 by means of a semi-circular cap 22 extending over the top of said block and secured at its opposite ends to the ends of the socket 8 by means of screws 23. This cap 22 is preferably a metal strap and is made with inwardly projecting flanges 24 and 25 at its front and rear sides, respectively to fit against the beveled marginal portions 13 and 14 of the block 10. It will be clear from this description that the socket 8 and cap 22 provide a block encircling ring that is part of the base portion 4, or carried by it, and that the inwardly extending flanges 24 and 25 of the cap together with the inwardly extending flanges 26 and 27 of the socket 8 hold the block securely against movement laterally within this ring-like holder.

The above described thermometer and closures for radiators is of very simple, strong and inexpensive construction and involves the employment of fewer parts than has been required in devices of this kind as heretofore constructed.

What I claim is:

1. A motor meter comprising a metal base portion provided with means for attachment to a radiator as a closure for the filler opening thereof, and a solid one-piece block of glass secured in position upon the top of said base, said block being molded with an internal vertically disposed attenuated tubular cavity communicating at its lower end with a reservoir enlargement, and a body of thermo-expansive liquid within said tubular cavity and reservoir, the portion of said glass block surrounding said reservoir enlargement being exposed to the atmosphere within the radiator when the meter is in position upon the latter, and said base portion being formed with a socket into which said glass block is fitted, and a cap member fastened to said base portion and serving to hold said block within said socket.

2. A motor meter comprising a one-piece disk-like block of transparent glass made at its bottom with a radial tubular extension providing within it a tubular compartment that is extended upwardly into said block; a body of thermo-expansive liquid within said tubular compartment, a two-part metal split ring surrounding said block having at opposite sides thereof inwardlly projecting flanges for holding said block in position within said ring, said split ring comprising a lower segment formed with an integral base portion in the form of a radiator cap having at its top an aperture through which said radial tubular extension projects, an upper segment, and means for fastening the two segments together to secure said block in position within said split ring.

3. A motor meter comprising a metal interiorly threaded radiator cap provided upon its top side with a socket and having an aperture formed through its top at the bottom of said socket, a solid approximately circular block of glass seated within said socket and made at its bottom with an extension projecting through said aperture, said block being formed interiorly and centrally with a vertical cavity terminating at its lower end in a reservoir enlargement located within the lower end portion of said extension; means engaging the top portion of said block for securing the latter within said socket, and a body of thermo-expansive liquid within said cavity and reservoir.

Signed by me at Boston, county of Suffolk, and State of Massachusetts, this 3rd day of December, 1927.

GEORGE VLASTIS.